US008518342B2

(12) United States Patent
Mosticone et al.

(10) Patent No.: US 8,518,342 B2
(45) Date of Patent: Aug. 27, 2013

(54) INTEGRATED ANALYSIS DEVICE WHICH CAN BE FITTED TO A CONTAINER HOUSING A SAMPLE TO BE ANALYZED

(75) Inventors: David Mosticone, Sainte-Consorce (FR); Pascal Montes, Fleurieux sur l'Arbresle (FR); Jean-Claude Raymond, Bessenay (FR); Bruno Colin, Marcy l'Etoile (FR); Cecile Paris, Bessenay (FR)

(73) Assignee: Biomerieux, Marcy l'Etoile (FR)

( * ) Notice: Subject to any disclaimer, the term of this patent is extended or adjusted under 35 U.S.C. 154(b) by 1280 days.

(21) Appl. No.: 11/597,867

(22) PCT Filed: Jun. 24, 2005

(86) PCT No.: PCT/FR2005/050491

§ 371 (c)(1),
(2), (4) Date: Nov. 29, 2006

(87) PCT Pub. No.: WO2006/008407

PCT Pub. Date: Jan. 26, 2006

(65) Prior Publication Data

US 2008/0152541 A1 Jun. 26, 2008

(30) Foreign Application Priority Data

Jun. 28, 2004 (FR) .................................... 04 51343

(51) Int. Cl.
*G01N 21/75* (2006.01)

(52) U.S. Cl.
USPC ........... 422/410; 422/400; 422/401; 422/402; 422/404; 422/405; 422/406; 422/408; 422/409; 422/413; 422/419; 422/420; 422/421; 422/422; 422/423; 422/424; 422/425; 422/426; 422/427; 422/428; 422/429; 422/430; 422/50; 422/500; 422/63; 422/66; 422/68.1; 422/82.01; 422/82.05; 422/82.06; 422/560; 422/561; 422/562; 422/563; 436/44; 436/46; 436/164; 436/169; 436/170; 435/13; 435/283.1; 435/287.1; 435/287.7; 435/287.8; 435/287.9; 435/288.7; 204/403.02; 206/363

(58) Field of Classification Search
USPC ............ 422/56, 57, 58, 59, 60, 61, 100, 555, 422/557; 436/169, 44, 46, 164, 170; 600/577; 435/13, 283.1, 287.1, 287.7, 287.8, 287.9, 435/288.7; 204/403.02; 206/363
See application file for complete search history.

(56) References Cited

U.S. PATENT DOCUMENTS 3,894,845 A * 7/1975 McDonald ...................... 422/61
5,500,375 A * 3/1996 Lee-Own et al. ............. 436/514

(Continued)

FOREIGN PATENT DOCUMENTS

DE 3504527 A1 2/1986
EP 0 678 745 A1 10/1995
WO WO 03/030739 A1 4/2003

*Primary Examiner* — Dennis M White

(74) *Attorney, Agent, or Firm* — Oliff & Berridge, PLC

(57) ABSTRACT

The present invention relates generally to the field of analysis, for example biological analysis. More specifically, the present invention relates to an analysis device (10, 40, 501, 60) designed to be associated with a container (22, 50, 70) containing a sample (28) to be analyzed, said device comprising essentially:

- a first impervious membrane (12, 42, 52, 62);
- a second impervious membrane (14, 44, 54, 64) superposed on the first membrane (12, 42, 52, 62);
- said first and second membranes being fixedly attached over at least a part of their surface, defining a peripheral zone, in order to define an interstitial space forming an internal reaction cavity (16, 46, 56, 66), with no means of fluid communication with the outside of said analysis device (10, 40, 501, 60);
- at least one analysis means (18, 47, 57, 67), placed inside said internal reaction cavity (16, 46, 56, 66), designed to be placed in contact with the sample (28);
- at least one means designed to create a way for the sample to enter said internal reaction cavity.

The present invention also relates to a container (22, 50, 70) comprising such an analysis device.

The present invention also relates to a method of analyzing a sample contained in a container, in which an analysis device according to the invention is used.

14 Claims, 5 Drawing Sheets

(56) References Cited

U.S. PATENT DOCUMENTS 5,595,187 A * 1/1997 Davis .............................. 600/584
5,788,863 A 8/1998 Milunic
2002/0048819 A1* 4/2002 Alley .............................. 436/169
2004/0191919 A1 9/2004 Unger et al.

* cited by examiner

INTEGRATED ANALYSIS DEVICE WHICH CAN BE FITTED TO A CONTAINER HOUSING A SAMPLE TO BE ANALYZED

The present invention relates generally to the field of analysis for example biological analysis. More specifically, the present invention relates to an integrated analysis device that can be fitted to a container of a sample to be analyzed.

In the analysis field, in particular that of biological analysis, the problem is regularly posed of the safety of the technician that handles the samples, particularly because of the risks of contamination that exist during the abstraction of an aliquot for the purpose of an analysis.

Thus, the risks run by the technician that has to abstract an aliquot from a pouch of blood intended for transfusion, in order to verify the harmlessness of this sample are known. Pouches of blood are containers that are far from easy to handle because of their flexible walls. The result of this is that the people who handle these pouches of blood may very easily come into contact with the sample and risk being contaminated if the latter is not free from pathogenic agents.

Contamination may also occur in the reverse direction. Specifically, it happens that, during the abstraction of biological liquids, such as urines, suspected of being contaminated, the person carrying out the abstraction contaminates the sample himself, making it impossible to provide a reliable diagnosis based on said sample.

In the case of food samples for the purposes of quality control, it is also very important to ensure that no parasitical contamination is caused by the technician who is in charge of the analysis. In addition, the food sample is frequently placed in a culture that has been made. This placing in a culture usually consists in placing the sample in a plastic pouch containing a culture medium, which makes it possible to develop microorganisms, in particular bacteria. After an incubation time necessary for microorganism development, one or more aliquot abstractions of the culture medium are carried out in order to perform a microbiological analysis. Aliquot abstractions are usually carried out by opening the pouch at the orifice for the insertion of the food sample and of the culture medium. Such a process is often critical to carry out because the technician responsible for this procedure must simultaneously keep the pouch open, hold the pouch closure device and the pipette which he uses to suck out the culture medium. Furthermore, such handling conditions substantially lengthen the analysis time. When the number of samples is large, productivity may thereby be seriously impaired.

Analysis devices designed to be connected to a biological sample container have already been described. This is the case, for example, of the analysis device of document WO-A-03/030739. The analysis device described in this application consists of a pouch, containing the analysis reactant, with a connection tube allowing the analysis device to be connected to the biological sample container.

Document DE-A-35 04 527 also describes an analysis device in the form of a pouch containing the analysis reactant, with a connection tube; said device being designed to be connected to a pouch of urine.

Although this type of device partially solves the problems identified hereinabove, it nevertheless comprises a certain number of disadvantages. The main disadvantage is that it can be used only with a container also comprising a connection tube to which said device may be fitted. Although this type of container is widely used in the medical field, it is virtually nonexistent in the agrobusiness quality control field in which the containers are much simpler.

The result of this is that this type of device can be fitted only to a limited number of containers, more specifically dedicated to the medical field.

Another disadvantage of this type of device is that it comprises a tube of fluid connection with the outside of the pouch. Even though this tube is initially stoppered, there is nevertheless a risk that the closure device of the tube may break, placing the pouch in communication with the ambient air; this may form a major source of contamination or of impairment of the analysis device.

Finally, a last disadvantage of such a device is that it does not make it possible to totally eliminate the risks of contamination of the technician at the moment of connecting the device to the biological sample container.

With regard to the technical problems raised by the prior art considered hereinabove, one of the essential objectives of the present invention is to provide a low cost analysis device that can be simply fitted to any type of container enclosing samples of the biological sampling type or samples for the purpose of quality control; such containers being, for example, pouches or sacs made of flexible plastic.

Another objective of the present invention is to provide an analysis device which, when it is fitted to said containers, limits the handling actions of the sample contained in the container, thereby limiting the risks of contamination, either of the person handling the sample, or of the sample itself.

Another objective of the present invention is to provide an analysis device that is less subjected to the risk of contamination or of impairment.

Another objective of the present invention is to provide an analysis device that makes it possible to dispense, if necessary, with the use of sampling equipment of the pipette or syringe type.

Another objective of the present invention is to provide an analysis device that makes it possible to reduce the time necessary for analyzing the sample.

Another objective of the present invention is to provide an analysis device making it possible to carry out different types of analysis.

Another objective of the present invention is to provide an analysis device which, being associated with the container of the sample to be analyzed, allows a better traceability of the analysis result.

Another objective of the present invention is to provide an analysis device which makes it possible to retrieve the sample or an aliquot abstraction of the sample for later analysis.

Another objective of the present invention is to provide an analysis device that makes it possible to take a sample through the flexible wall of a container, while keeping said container sealed.

A final objective of the present invention is also to provide a container designed to enclose a biological sample, said container permanently incorporating an analysis device, thus limiting the handling of the sample and making the analysis easier.

These objectives, amongst others, are achieved by the present invention which relates in the first place to an analysis device designed to be associated with a container, comprising a sample to be analyzed, said device comprising essentially:

- a first impervious membrane;
- a second impervious membrane superposed on the first membrane;
- said first and second membranes being fixedly attached over at least a portion of their surface, defining a peripheral zone, in order to create an interstitial space forming an internal reaction cavity, with no means of fluid communication with the outside of said analysis device;

at least one analysis means, placed inside said internal reaction cavity, designed to be placed in contact with the sample;

at least one means designed to create a way for the sample to enter said internal reaction cavity.

According to a preferred embodiment, the means designed to create a way for the sample to enter said internal reaction cavity consists of at least one preferred gripping zone, placed on one of said first or second membranes, making it possible to separate said first and second membranes at least partially from one another, in order to make the internal reaction cavity accessible to the sample contained in the container.

According to another embodiment, the means designed to create a way for the sample to enter said internal reaction cavity consists of at least one means designed to act on one of said first or second membranes.

Preferably, this means is a perforation means.

Still more preferably, the perforation means is placed inside the cavity.

According to an alternative embodiment, the means designed to create a way for the sample to enter said internal reaction cavity consists of the second membrane, consisting of a material having a breaking strength value less than that of the material forming the first membrane.

More particularly, this material is included in the group comprising aluminum, copper or any strip that can be laminated.

According to an advantageous variant, the analysis device comprises a septum fixedly attached to the first membrane, at least partially covering the latter.

Preferably, the analysis means is included in the group comprising the porous reaction media such as the small strips for measuring pH, the small immunochromatography strips, the small biochemical substrate strips or any equivalent analysis means.

Another object of the invention relates to a container comprising at least one analysis device as defined hereinabove.

According to a preferred embodiment, the analysis device is fixedly attached to a wall of said container.

According to a first variant of this embodiment, the second membrane of the analysis device is fixedly attached to the wall of the container.

According to a second variant of this embodiment, the second membrane is in direct contact with the sample to be analyzed.

Another object of the present invention relates to a method of analyzing a sample contained in a container, having at least one wall at least partially formed of a material capable of being perforated, said method essentially comprising the following steps:

a) attaching, by any appropriate means, the analysis device as claimed in one of claims 1 to 9 to the part of the wall of the container formed of a material capable of being perforated;

b) placing the sample to be analyzed in contact with the analysis means of the analysis device, by perforating the second membrane of the analysis device and the part of the wall of the container situated opposite said second membrane, thus making it possible to transfer the sample into the internal reaction cavity;

c) analyzing the result supplied by the analysis means.

According to a first variant, step a) is carried out with the aid of the perforation means placed in the internal reaction cavity.

According to a second variant, step a) is carried out with the aid of an independent perforation means of the analysis device.

According to a preferred embodiment of this second variant, step a) consists in perforating the two membranes of the device and the wall of the container with the aid of the perforation means, the septum fixedly attached to the first membrane delimiting the zone of perforation of said first membrane, thus preventing the sample to be analyzed from escaping from the analysis device, once the perforation means has been withdrawn.

Another object of the present invention relates to a method of analyzing a sample contained in a container, said method comprising essentially the steps consisting in:

a') placing the analysis device as claimed in one of claims 1 to 9 inside the container;

b') placing the sample to be analyzed in contact with the analysis means of the analysis device, by transferring the sample into the internal reaction cavity;

c') analyzing the result supplied by the analysis means.

According to a first embodiment, step b') consists in perforating the first or the second membrane of the analysis device.

According to a second embodiment, step b') consists in separating at least partially the first and second membranes, with the aid of the preferred gripping zones placed on said first and second membranes.

Another subject of the present invention relates to the use of an analysis device in order to analyze a sample contained in a container.

The aims and advantages of the present invention will be better understood in the light of the following detailed description made with reference to the drawings in which.

Figure 1A:
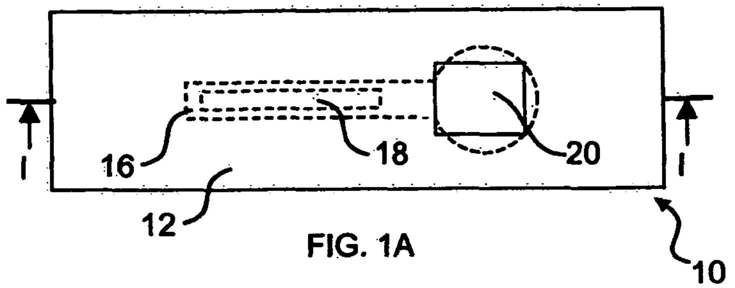
FIG. 1A represents a top view of a first embodiment of the analysis device according to the invention.
Figure 1B:
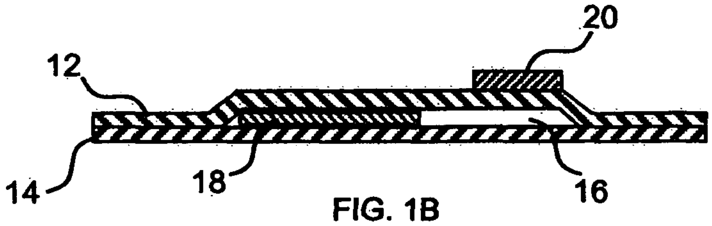
FIG. 1B represents a view in longitudinal section along the axis I-I of the analysis device represented in FIG. 1A.

The analysis device as shown in FIGS. 1A and 1B, according to a first embodiment, has the shape of a patch 10. It comprises a first membrane 12, forming the top membrane in FIG. 1B and a second membrane 14, forming, for its part, the bottom membrane. These two membranes are advantageously made of a plastic material of the polyethylene (PE), polypropylene (PP) type or any equivalent material. Such a material makes it possible to obtain flexible, transparent and impervious membranes. However, it is essential for this material to be able to be perforated. The two membranes are fixedly attached over a part of their inner surface by bonding or any other appropriate equivalent means such as heat-sealing, thus defining an interstitial zone 16, playing the role of an internal reaction cavity. This cavity is shown here in the form of a rectangular part of limited width, being extended at one of its ends by a spherical zone. An analysis means 18 is placed inside the rectangular part of the internal reaction cavity 16.

"Analysis means" means any reaction test making it possible to measure one or more biological and/or physicochemical parameters of a sample, to display the presence of a contaminant or of a particular marker in said sample.

Thus, as an example and in a manner in no way limiting, the analysis means may be a small reaction strip advantageously used in environmental quality control, such as the physicochemical analysis of water, the measurement of pH, agrobusiness inspection, such as microbiological inspection, the detection of allergy carriers, bioterrorism, or of course clinical analyses, such as the chemical or microbiological inspection of urines, blood, pregnancy tests. This type of tool is well known to those skilled in the art and widely used both in analysis laboratories and in industry.

On the outer face of the first membrane 12 and level with the spherical zone of the internal reaction cavity, there is a deposit of a material with elastic properties, in the form of a layer 20 of small surface area. This layer 20 plays the role of a septum. The function of this layer will be more amply explained in FIGS. 3A to 3C hereinafter. The elastic material forming the septum 20 may be for example an appropriate silicone, such as a curable silicone with alcoxy functions or made of natural rubber.

Figure 2:
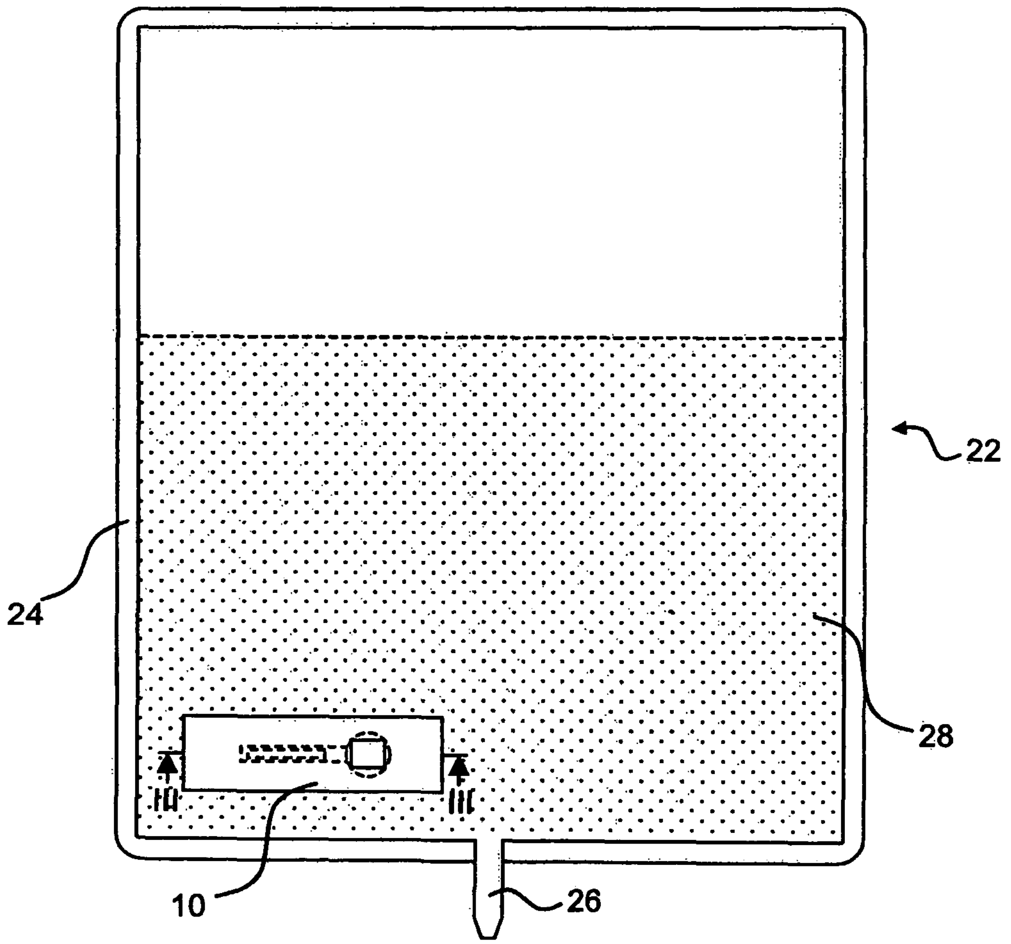
FIG. 2 represents a container supporting an analysis device as represented in FIGS. 1A and 2B.

FIG. 2 represents a front view of a container of a sample to be analyzed. More precisely, this container 22 is, in this example, a blood sampling pouch. This container 22 comprises two flexible walls, transparent where necessary, an anterior wall 24 and a posterior wall not shown in this figure, these two walls being fixedly attached at their periphery. It also comprises, in its bottom part, an end-piece 26 from which the sample 28 is routed into the container. This end-piece is blanked by means of a blanking means not shown. Placed on the anterior wall 24 is the analysis device 10, as shown in FIGS. 1A and 1B. This analysis device 10 is positioned so that it is in contact with a part of the wall 24, itself in contact with the sample 28.

Figure 3A:
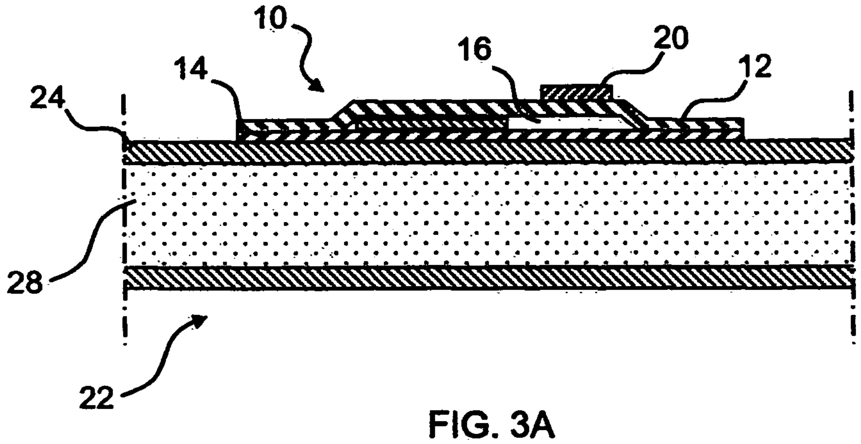
FIG. 3A represents a partial view in longitudinal section along the axis III-III of the container represented in FIG. 2.

A view in partial section along the axis III-III of FIG. 2 is shown in FIG. 3A. It is noted that the analysis device 10 is fixedly attached to the wall 24 of the container 22 via its second membrane 14. This may be attached by means of a bonding film placed on the outer face of the membrane 14 during the manufacture of the analysis device 10. According to a variant, it is possible to use a deposit of adhesive or a piece of double-sided adhesive tape when the analysis device is placed on the container. The result of this is that the analysis device is fixedly attached to the container 22 and is ready to be used.

Figure 3B:
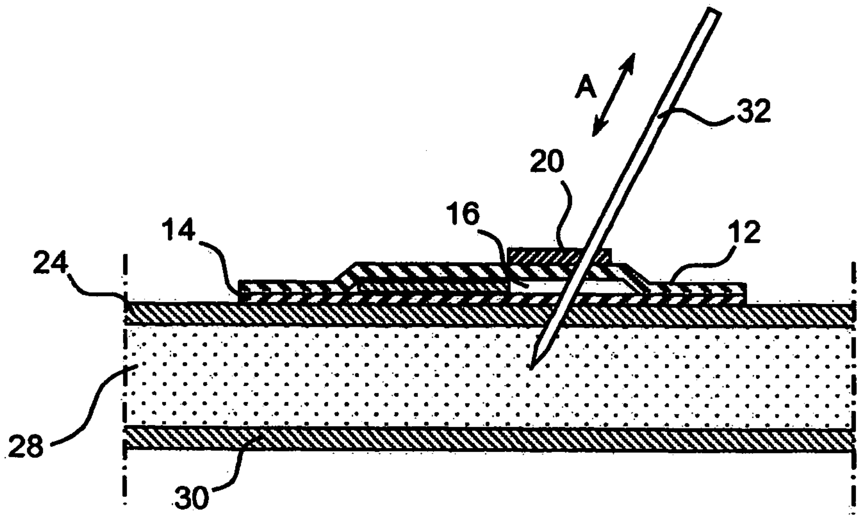
FIG. 3B represents a partial view in longitudinal section along the axis III-III of the container represented in FIG. 2, during the step of perforating the analysis device.

When the technician in charge of the analysis decides to carry out the latter, he uses a perforation means, represented in FIG. 3B in the general shape of a point 32. This point 32 is positioned over the septum 20. The technician then perforates the analysis device at the septum 20 in a movement represented by the double arrow A, so that the perforation means 32 sequentially perforates the septum 20, the membranes 12 and 14 of the analysis device and the anterior wall 24, without however perforating the posterior wall 30 of the container 22. The perforation means 32 is then withdrawn, in the direction of the arrow A.

Figure 3C:
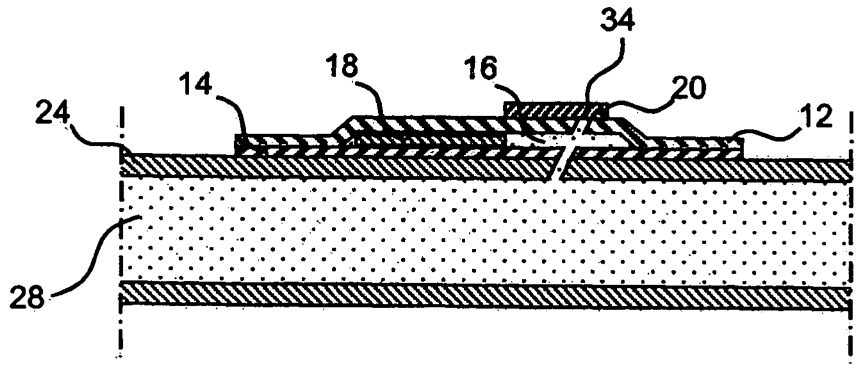
FIG. 3C represents a partial view in longitudinal section along the axis III-III of the container represented in FIG. 2, after the sample has penetrated the internal reaction cavity.

It follows that the internal reaction cavity 16 of the analysis device 10 then communicates with the inside of the container 22 and is therefore in contact with the sample 28, as shown in FIG. 3C. The latter is, in fact, aspirated into the orifice formed in the anterior wall 24 and in the membrane 14 by capillary effect, until it reaches the internal reaction cavity 16 and then makes contact with the analysis means 18. After the perforation means 32 has been withdrawn, the orifice made in the septum 20 closes of its own accord, thanks to the elastic properties of the material forming the septum, leaving only a simple scar 34 in said septum. It follows therefore that the analysis device recovers its properties of impermeability, preventing the sample from being spread outside the analysis device and thus contaminating the environment or the technician handling the sample.

The analysis means 18 being in contact with the sample 28, the analysis can then take place, so that, after the time necessary for the reaction, the technician may read the analysis result on the analysis means through the membrane 12, since the latter is made of transparent material.

Although, in these FIGS. 3A and 3B, the perforation means represented is a point, it is nevertheless possible to use any suitable perforation means so long as the latter is inert with respect to the chemical or biological reaction(s) taking place during the analysis.

Figure 4A:
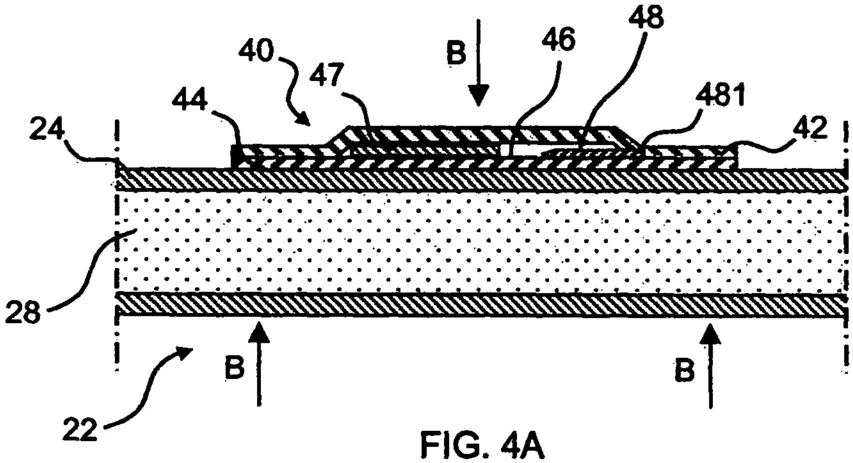
FIG. 4A represents a partial view in longitudinal section of a container supporting a second embodiment of the device according to the invention.
Figure 4B:
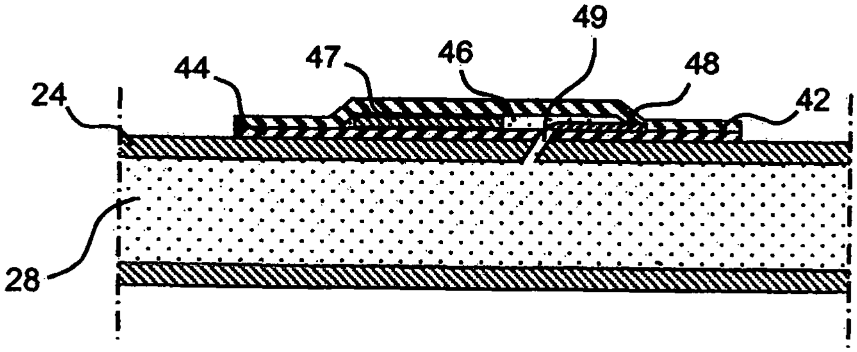
FIG. 4B represents the container represented in FIG. 4A, after the sample has penetrated the internal reaction cavity.

A second embodiment of the analysis device according to the invention is represented in FIGS. 4A and 4B. In accordance with FIGS. 3A to 3C, the analysis device 40 is shown fixedly attached to the container 22. In a manner similar to the first embodiment described in FIG. 1B, the device 40 comprises a first membrane 42, forming the top membrane in FIG. 4A and a second membrane 44 forming, for its part, the bottom membrane. The two membranes are fixedly attached over a part of their inner surface by bonding or any other appropriate equivalent means, thus defining the interstitial zone 46, playing the role of internal reaction cavity. The analysis means 47 is placed inside the internal reaction cavity 46. The analysis device 40 also comprises a perforation means 48 also placed inside the internal reaction cavity 46. This perforation means 48 here consists of a point fixedly attached to the analysis device via its end 481 opposite to the pointed end. This point may be made of any rigid material such as a metal or a rust-resistant alloy, a plastic, etc. It is however important that this material should be inert to the chemical or biological reaction(s) taking place during the analysis.

It should be noted that the analysis device 40 may advantageously be independent of the container, although this is not shown in FIGS. 4A and 4B.

During the realization of the analysis, the handling technician takes the container in his hands in the vicinity of the analysis device and makes a twisting movement of the latter and therefore of the container 22 in the direction of the arrows B, so that the point of the perforation means 48 comes to perforate the membrane 44 of the analysis device and the anterior wall 24 of the container 22 without perforating the posterior wall 30. Advantageously, the perforation means may comprise a guard making it possible to limit the travel of the latter. When the perforation has taken place, the handler relaxes his pressure so that the analysis device 40 and the container 22 resume their initial shape. The perforation means 48 then resumes its position substantially parallel to the membrane 44. The sample 28, which was, possibly, withdrawn at the twisting zone, then resumes its place and is aspirated into the hole 49, made in the membrane 44 and the anterior wall 24 of the analysis device until it reaches the internal reaction cavity as shown in FIG. 4B. The analysis means then makes contact with the sample, so that, in the case of presence of an analyte or analytes to be detected, a reaction takes place in the internal reaction cavity 46. The analysis result may then be read directly through the transparent membrane 42.

Figure 5A:
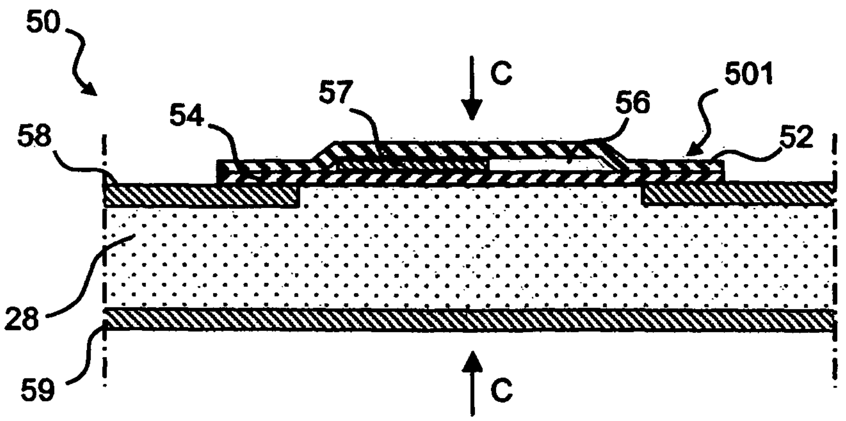
FIG. 5A represents a partial view in longitudinal section of a container supporting a third embodiment of the device according to the invention.
Figure 5B:
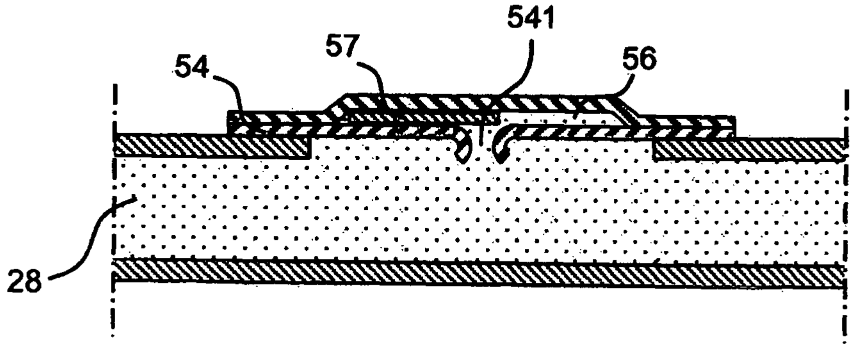
FIG. 5B represents the container represented in FIG. 5A, after a sample has penetrated the internal reaction cavity.

A third embodiment of the analysis device according to the invention is shown in FIGS. 5A and 5B.

Unlike the first two embodiments described hereinabove, the analysis device 501 represented in figures SA and 5B here forms an integral part of the container 50. The analysis device 501 still comprises two membranes, a first membrane 52, forming the top membrane in FIGS. 5A and 5B, and a second membrane 54, forming, for its part, the bottom membrane. The two membranes are fixedly attached over a part of their inner surface by bonding or any other appropriate equivalent means, thus defining an interstitial zone 56, playing the role of an internal reaction cavity. The analysis means 57 is placed inside the internal reaction cavity 56. As can be seen in FIGS. 5A and 5B, the anterior wall 58 of the container 50 has a cut-out in a zone situated level with the analysis device 501 so that the membrane 54 of the analysis device is directly in contact with the sample 28 contained in the container 50 via its outer face. The latter also comprises a posterior wall 59.

Concerning the bottom membrane 54, it is advantageous for the latter to be made of a material having a reasonably low breaking strength value. Such a material is different from that used to form the top membrane 52 which must have a breaking strength value greater than the membrane 54. Thus, the material forming the membrane 54 may, for example, be a sheet of aluminum, having a thickness of from a few hundredths of a micrometer to a few micrometers and advantageously a few tenths of a micrometer. According to an alternative, this material may also be copper or any strip that can be laminated. The material forming the membrane 52 is, for its part, identical to that used for the embodiments described hereinabove.

To place the analysis device in contact with the sample, it is advantageous to use a perforation means (not shown in FIGS. 5A and 5B). Such a perforation means may, for example, be of the pincer type. This pincer may advantageously comprise one arm whose end has a protruding zone, called the male part, and one arm whose end has a cupped zone matching the protruding zone, called the female part. The technician handler then pinches the container 50 at the analysis device 501, in the direction of the arrows C, so that the membranes of the analysis device and the posterior wall 59 of the container are trapped between the male part and the female part. The result of this is that, by exerting sufficient pressure, the membrane 54 breaks, while the membrane 52 and the posterior wall 59 resist, due to their greater strength properties. As can be seen in FIG. 5B, the membrane 54 having a perforation 541, the sample 28 contained in the container infiltrates into the internal reaction cavity 56 and thus enters into contact with the analysis means 57. The analysis result may then be read directly through the transparent membrane 42.

According to a variant of this embodiment, the material forming the membrane 54 may be a breakable material. Thus, the technician who has to carry out the analysis may dispense with using an object of the pincer type to pierce the membrane 54. He simply has to perforate the device with a fingernail or twist it so as to break the membrane.

It should be noted that according to this embodiment and unlike those described hereinabove, the container is manufactured with the analysis device integrated. Specifically, the latter cannot be fitted to one of the walls of the container.

On the other hand, another variant of this embodiment consists in an analysis device manufactured independently of the container, so that it can be slid inside the container, directly in contact with the sample. To carry out the analysis, the analysis device should then be trapped in one of the bottom corners of the container so that the technician handler may perforate the device with the aid of the pincer described hereinabove and do so directly through the container. So that this variant embodiment operates correctly, it is naturally appropriate that the walls of the container resist the perforation, but also that the latter are sufficiently flexible to allow the perforation of the analysis device. It is also appropriate that the walls of the container are transparent so that the analysis result can be read.

Figure 6A:
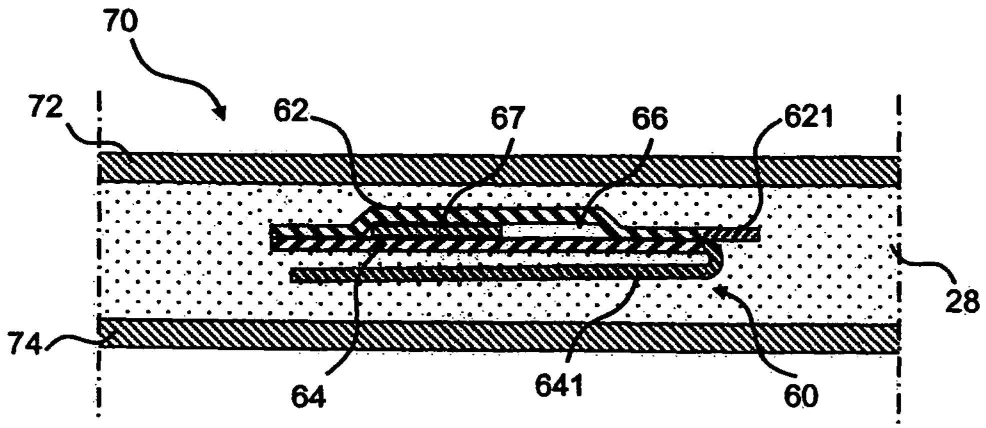
FIG. 6A represents a partial view in longitudinal section of a container inside which there is a fourth embodiment of the device according to the invention.
Figure 6B:
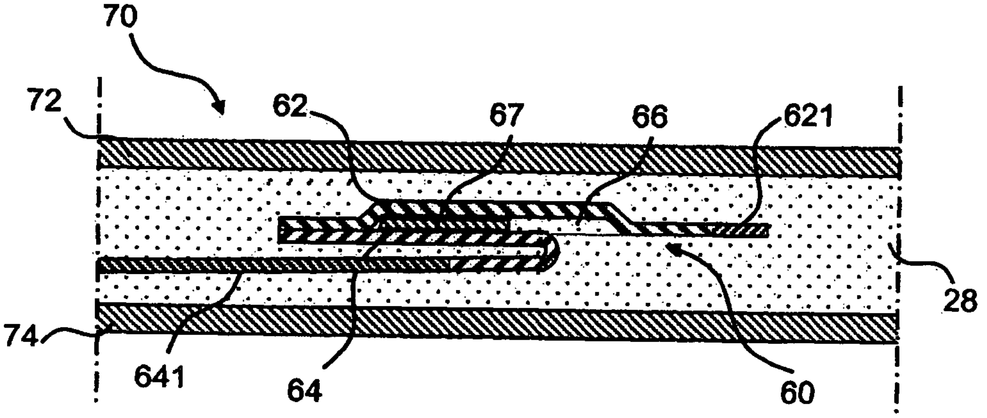
FIG. 6B represents the container represented in FIG. 6A, after the sample has penetrated the internal reaction cavity.

A last embodiment is shown in FIGS. 6A and 6B. In a manner comparable to the variant of the preceding embodiment, described hereinabove, the analysis device 60 described here is suitable for being placed inside a container 70 comprising two walls 72 and 74 defining an internal volume in which the sample 28 lies. This analysis device 60 consists of a first membrane 62, forming the top membrane in FIG. 6A and a second membrane 64 forming, for its part, the bottom membrane. These two membranes are fixedly attached over a part of their inner surface, thus defining the interstitial zone 66, playing the role of the internal reaction cavity. The analysis means 67 is placed inside the internal reaction cavity 66. The analysis device 60 also comprises two preferred gripping zones. The first preferred gripping zone 621 is placed in the extension of the membrane 62. The second preferred gripping zone 641 is placed in the extension of the membrane 64. Unlike the first, this second gripping zone 641 preferably comprises a return so that it is substantially superposed on the membrane 64. It follows that the free ends of the gripping zones 621 and 641 are oriented in opposite directions. These gripping zones may be made of a plastic identical to that forming the membranes 62 and 64. Advantageously, the gripping zones form an integral part of the membranes 62 and 64. More advantageously still, these gripping zones may comprise means making gripping easier. These means may be rings for example.

When the technician handler desires to make the analysis, he grasps the analysis device through the container so as to hold the gripping zone 621 with one hand and the gripping zone 641 with the other hand. In each hand, he therefore holds respectively one of the walls of the container and a gripping zone. By pulling in opposite directions on the gripping zones, the membranes 62 and 64 are separated partially so that the internal reaction cavity 66 is in contact with the sample 28, as shown in FIG. 6B. It is advantageous that the means of fixedly attaching the membranes 62 and 64, in other words the adhesive used, does not produce too strong a bond, in order to provide an easy separation of the two membranes when the gripping zones 621 and 641 are pulled. This parameter is all the more important since the handling of the analysis device is carried out inside the container. Accordingly, the handling of the analysis device is limited in terms of space. It is also necessary, for this embodiment, that the container comprises the most flexible walls possible to make the analysis device easier to grip.

A variant of the analysis device may also be envisaged in which the analysis means may be separated from said device once the analysis has been made. Specifically, since this analysis means comprises a concentrate of the analyzed sample, it may be envisaged to use it to carry out other analyses. These analyses may be, for example, microbiological analyses. The analysis device may then be used to sow a microbiological culture medium on a Petri dish.

The analysis device according to the invention may be adapted to various types of containers, such as blood pouches, sacs used for industrial microbiological analyses and more generally to any container that comprises flexible walls that can be perforated or easily grasped. It therefore constitutes a preferred device for carrying out various analyses on samples that are also very diverse.

Another advantage of the analysis device according to the invention is that it makes it possible to avoid, if necessary, all direct contact with the sample, in case the latter is dangerous.

The invention claimed is:

1. An analysis device designed to be associated with a container containing a sample to be analyzed, the analysis device comprising:

- a first impervious membrane;
- a second impervious membrane superposed on the first membrane, the second membrane being configured to be attached to an outside wall of the container, wherein the second impervious membraned is planar and flexible along its entire length, and wherein the outside wall of the container is separate from the second membrane;
- the first and second membranes being fixedly attached over at least a portion of their respective surfaces, the portion defining a peripheral zone of an interstitial space forming an internal reaction cavity with no fluid communication with an outside of the analysis device;
- at least one analysis means placed inside the internal reaction cavity, the analysis means designed to be placed in contact with the sample; and
- at least one means designed to create a way for the sample to enter the internal reaction cavity,
- wherein the at least one means designed to create a way for the sample to enter the internal reaction cavity is a perforation device, and a point of the perforation device perforates the second membrane and an anterior wall of the container without perforating a posterior wall of the container wherein the perforation device is placed inside the cavity.

2. The device as claimed in claim 1, wherein the means designed to create a way for the sample to enter said internal reaction cavity comprises the second membrane, the second membrane consisting of a material having a breaking strength value less than that of a material forming the first membrane.

3. The device as claimed in claim 2, wherein the material of the second membrane is selected from the group consisting of aluminum, copper and a strip that can be laminated.

4. An analysis device as claimed in claim 1, wherein the analysis means is selected from the group consisting of a porous reaction media for measuring pH, immunochromatography strips, and biochemical strips.

5. A container comprising at least one analysis device as claimed in claim 1.

6. The container as claimed in claim 5, wherein the analysis device is fixedly attached to a wall of the container.

7. The container as claimed in claim 6, wherein the second membrane of the analysis device is fixedly attached to the wall of the container.

8. The container as claimed in claim 7, wherein the second membrane is in direct contact with the sample to be analyzed.

9. The device as claimed in claim 1, wherein the second membrane includes an adhesive for attaching the second membrane to the outside wall of the container.

10. A method of analyzing a sample contained in a container, having at least one wall at least partially formed of a material capable of being perforated, the method comprising:

- attaching the analysis device as claimed in claim 1 to the part of the wall of the container formed of a material capable of being perforated;
- placing the sample to be analyzed in contact with the analysis means by perforating the second membrane of the analysis device and the part of the wall of the container situated opposite said second membrane, thereby making it possible to transfer the sample into the internal reaction cavity; and
- analyzing a result supplied by the analysis means.

11. The method as claimed in claim 10, wherein a perforation device is placed in the internal reaction cavity.

12. A method of analyzing a sample contained in a container, the method comprising:

- placing the analysis device as claimed in claim 1 inside the container;
- placing the sample to be analyzed in contact with the analysis means of the analysis device, by transferring the sample into the internal reaction cavity; and
- analyzing the result supplied by the analysis means.

13. The method as claimed in claim 12, wherein in the placing comprises perforating the second membrane of the analysis device.

14. The method as claimed in claim 12, wherein the placing comprises at least partially separating the first and the second membrane with gripping zones placed on the first membrane and the second membrane.

* * * * *